United States Patent
Ikuta et al.

(10) Patent No.: US 8,323,487 B2
(45) Date of Patent: Dec. 4, 2012

(54) WASTE WATER TREATMENT APPARATUS

(75) Inventors: Hajime Ikuta, Tokyo (JP); Tatsuo Sumino, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 280 days.

(21) Appl. No.: 12/696,082

(22) Filed: Jan. 29, 2010

(65) Prior Publication Data

US 2010/0193431 A1  Aug. 5, 2010

(30) Foreign Application Priority Data

Jan. 30, 2009 (JP) ................................. 2009-020333

(51) Int. Cl.
*C02F 3/00* (2006.01)

(52) U.S. Cl. .................. 210/196; 210/205; 210/631

(58) Field of Classification Search .................. 210/631, 210/196, 205
See application file for complete search history.

(56) References Cited

U.S. PATENT DOCUMENTS

| | | |
|---|---|---|
| 7,192,765 B2 | 3/2007 | Sumino et al. |
| 2008/0110825 A1 * | 5/2008 | Yamaguchi et al. .......... 210/605 |

FOREIGN PATENT DOCUMENTS

| | | |
|---|---|---|
| DE | 197 48 000 A1 | 5/1999 |
| JP | 2002316192 A  * | 10/2002 |
| JP | 2003-154393 | 5/2003 |
| JP | 3788601 | 4/2006 |
| JP | 2008-272610 | 11/2008 |

OTHER PUBLICATIONS

European Search Report dated Jun. 8, 2010 in English.
JP office action dated of Appln. No. 2009-020333 Jan. 16, 2012 with English translation.

* cited by examiner

*Primary Examiner* — Chester Barry
(74) *Attorney, Agent, or Firm* — Antonelli, Terry, Stout & Kraus, LLP.

(57) ABSTRACT

A method for producing a nitrite type nitrification-reactive sludge includes the step of subjecting an activated sludge to alkali treatment so that the pH of the activated sludge containing at least the ammonium oxidizing bacteria and nitrite oxidizing bacteria can be 10 or higher, in order to accumulate ammonium oxidizing bacteria with higher priority in the activated sludge.

8 Claims, 13 Drawing Sheets

FIG.3

| COMPONENT | CONCENTRATION (mg/L) |
|---|---|
| $NH_4Cl$ | 153 |
| $NaHCO_3$ | 468 |
| $Na_2HPO_4 \cdot 12H_2O$ | 46.4 |
| $NaCl$ | 20.4 |
| $KCl$ | 9.60 |
| $CaCl_2 \cdot 2H_2O$ | 9.60 |
| $MgSO_4 \cdot 7H_2O$ | 33.6 |

| COMPONENT | CONCENTRATION (mg/L) |
|---|---|
| $NaNO_3$ | 269 |
| $NaHCO_3$ | 468 |
| $Na_2HPO_4 \cdot 12H_2O$ | 46.4 |
| $NaCl$ | 20.4 |
| $KCl$ | 9.60 |
| $CaCl_2 \cdot 2H_2O$ | 9.60 |
| $MgSO_4 \cdot 7H_2O$ | 33.6 |

| COMPONENT | CONCENTRATION (mg/L) |
|---|---|
| $NH_4Cl$ | 170 |
| $NaHCO_3$ | 468 |
| $Na_2HPO_4 \cdot 12H_2O$ | 46.4 |
| $NaCl$ | 20.4 |
| $KCl$ | 9.60 |
| $CaCl_2 \cdot 2H_2O$ | 9.60 |
| $MgSO_4 \cdot 7H_2O$ | 33.6 |

| ITEM | AVERAGE CONCENTRATION (mg/L) |
|---|---|
| BOD | 10 |
| $NH_4-N$ | 40 |
| $PO_4-P$ | 1.1 |
| SS | 20.4 |

WASTE WATER TREATMENT APPARATUS

BACKGROUND OF THE INVENTION

1. Field of the Invention

The present invention relates to a nitrite type nitrification-reactive sludge, a production method therefor, a production apparatus therefor, a waste water treatment method and a waste water treatment apparatus. Here, the nitrite type nitrification-reactive sludge means an activated sludge in which ammonium oxidizing bacteria that oxidize ammonium nitrogen to nitrite have been accumulated with higher priority.

2. Description of the Related Art

A nitrating denitrification method is known as a method for treating waste water containing ammonium nitrogen, which is a method of nitrating (oxidizing) ammonium nitrogen to nitrate by nitrifying bacteria, and then reducing the nitrate to nitrogen gas by denitrifying bacteria to remove ammonium nitrogen.

However, in the above described nitrating denitrification method, the ammonium nitrogen ($NH_4$) in the waste water is nitrified to nitrate ($NO_3$) through nitrite ($NO_2$), and a large quantity of oxygen needs to be supplied in the nitrification reaction. In addition, in the denitrification reaction of converting the nitrate to nitrogen gas, a large quantity of hydrogen donors (methanol, for instance) needs to be supplied.

Then, it is considered to stop the nitrification reaction of the ammonium nitrogen in a stage of nitrite and denitrifying the nitrite to nitrogen gas thereby to reduce the quantity of oxygen to be supplied in the nitrification reaction and the quantity of the hydrogen donor to be supplied in the denitrification reaction.

On the other hand, a method for treating a waste water, which includes denitrification treatment with anaerobic ammonium oxidizing bacteria, has drawn attention as a method for treating the waste water substitutable for a conventional nitrating denitrification method. This method includes nitriting the ammonium nitrogen in the waste water into nitrite, and simultaneously denitrifying the nitrite and the ammonium nitrogen in the waste water with the anaerobic ammonium oxidizing bacteria, and accordingly is more advantageous than the conventional nitrating denitrification method, in the points of not only being capable of reducing the amount of oxygen to be supplied in the nitrification reaction, but also needing no supply of the hydrogen donor in the denitrification reaction. However, in order to treat the waste water with the anaerobic ammonium oxidizing bacteria, the nitrification reaction of the ammonium nitrogen in the waste water needs to be stopped in the stage of nitrite.

For such a reason, some methods are proposed which are directed at producing a microorganism carrier which provides the nitrite type nitrification reaction of nitrating the ammonium nitrogen in the waste water into nitrite.

For instance, Japanese Patent No. 3788601 discloses a method for stopping the nitrification reaction of the ammonium nitrogen at the stage of nitrite, by accumulating only nitrifying bacteria suitable for the nitrite type nitrification reaction through heat treatment. This method subjects a carrier containing ammonium oxidizing bacteria which oxidize the ammonium nitrogen to nitrite and nitrite oxidizing bacteria which nitrite the nitrite to nitrate to heat treatment to deactivate the nitrite oxidizing bacteria and accumulate the ammonium oxidizing bacteria in the carrier with higher priority. By using the carrier, the nitrification reaction of the ammonium nitrogen in the waste water can be stopped at the stage of the nitrite.

SUMMARY OF THE INVENTION

However, the method described in Japanese Patent No. 3788601 needs to supply a large quantity of thermal energy when heat-treating the carrier. For this reason, a method of needing no heat treatment for the carrier is proposed from the viewpoint of reducing the energy cost.

For instance, Japanese Patent Application Laid-Open No. 2008-272610 discloses a method of subjecting a carrier on which an activated sludge containing ammonium oxidizing bacteria and nitrite oxidizing bacteria is collectively fixed, to acid treatment to form a carrier on which the ammonium oxidizing bacteria have been accumulated with higher priority, and using the carrier for the waste water treatment.

However, the method described in Japanese Patent Application Laid-Open No. 2008-272610 needs to periodically subject the carrier to acid treatment so as to deactivate the nitrite oxidizing bacteria which are brought in together with the waste water or the like from the outside, and then gradually deteriorates the mechanical strength of the carrier on some conditions of the acid treatment, which may make the nitrifying bacteria existing in the inner part of the carrier flow out.

In addition, in order to periodically subject the carrier to the acid treatment, the method has to separate the carrier from the waste water in the nitrification reaction tank and recover only the carrier, and consequently needs a complicated process for recovering the carrier.

Furthermore, when the carrier which has been subjected to the acid treatment is charged into the nitrification reaction tank without being neutralized, the pH in the nitrification reaction tank is lowered, and a rate of the nitrification reaction occasionally decreases.

The present invention is designed with respect to the above described circumstances, and is directed at providing a nitrite type nitrification-reactive sludge which can be used in stable and simple waste water treatment of a low energy cost for a long period of time, a production method therefor, a production apparatus therefor, a waste water treatment method and a waste water treatment apparatus.

A method for producing a nitrite type nitrification-reactive sludge according to the present invention is a method for producing a nitrite type nitrification-reactive sludge in which ammonium oxidizing bacteria have been accumulated with higher priority, and includes the step of subjecting activated sludge to alkali treatment so that the pH of the activated sludge containing at least the ammonium oxidizing bacteria and nitrite oxidizing bacteria can be 10 or higher.

Here, the phrase "pH is 10 or higher" includes not only the case that the pH is 10 or higher but lower than 14, but also the case that the pH is 14 or higher which is hardly measured by a pH meter. In the present specification, "pH" means $-\log_{10}$ [$H^+$] in a state of 25° C. and 1 atm, wherein [$H^+$] represents hydrogen ion concentration (mol/L).

As a result of an extensive investigation made by the present inventors, it became clear that the ammonium oxidizing bacteria have high resistance to an alkaline environment, while the nitrite oxidizing bacteria have low resistance to the alkaline environment. The above described production method uses the difference between the alkali resistances of the ammonium oxidizing bacteria and the nitrite oxidizing bacteria, and can accumulate the ammonium oxidizing bacteria in activated sludge with higher priority by subjecting the activated sludge to the alkali treatment and thereby deactivating the nitrite oxidizing bacteria.

In addition, the alkali treatment for the activated sludge can be conducted at a lower cost than that of heat treatment for the carrier, and accordingly can reduce the energy cost.

The production method also can prevent a rate of the nitrification reaction from decreasing due to the damage of the carrier, by accumulating the ammonium oxidizing bacteria not on a carrier but in activated sludge, and accordingly can omit a complicated process for recovering the carrier.

Furthermore, the production method can omit the neutralization treatment because even though the activated sludge which had been subjected to the alkali treatment was discharged into the nitrification reaction tank without being neutralized, the rate of the nitrification reaction does not decrease.

In the method for producing the nitrite type nitrification-reactive sludge, it is preferable to hold the pH of the activated sludge in a range of 10 or higher but 14 or lower (more preferably 11 or higher but 14 or lower) in the alkali treatment step, by adding an alkaline liquid to the activated sludge.

By adjusting the pH of the activated sludge in the above described range, the nitrite oxidizing bacteria can be selectively deactivated though the ammonium oxidizing bacteria are not deactivated.

In the method for producing the nitrite type nitrification-reactive sludge, the above described alkali treatment is preferably conducted under at least one condition of the following (1) to (3):

(1) holding the pH of the activated sludge in the range of 13 or higher for 5 minutes or longer;
(2) holding the pH of the activated sludge in the range of 12 or higher and lower than 13 for 10 minutes or longer; and
(3) holding the pH of the activated sludge in the range of 10 or higher and lower than 12 for 60 minutes or longer.

Thereby, an activated sludge can be produced in which the ammonium oxidizing bacteria have been more selectively accumulated while the nitrite oxidizing bacteria are surely deactivated.

A nitrite type nitrification-reactive sludge according to the present invention can be produced with the method for producing the nitrite type nitrification-reactive sludge.

An apparatus for producing a nitrite type nitrification-reactive sludge according to the present invention is an apparatus for producing a nitrite type nitrification-reactive sludge in which ammonium oxidizing bacteria have been accumulated with higher priority, and includes an alkali treatment apparatus which subjects an activated sludge containing at least ammonium oxidizing bacteria and nitrite oxidizing bacteria to alkali treatment therein so that the pH of the activated sludge can be 10 or higher.

The alkali treatment apparatus deactivates the nitrite oxidizing bacteria in the activated sludge by subjecting the activated sludge to alkali treatment of controlling the pH to 10 or higher, and can accumulate the ammonium oxidizing bacteria in the activated sludge with higher priority.

A waste water treatment method according to the present invention is a method for treating a waste water containing ammonium nitrogen, and includes the steps of: subjecting an activated sludge containing at least ammonium oxidizing bacteria and nitrite oxidizing bacteria to an alkali treatment so that the pH of the activated sludge can be 10 or higher; oxidizing the ammonium nitrogen contained in the waste water into nitrite with the activated sludge which has been subjected to the alkali treatment; and subjecting the nitrite to denitrification treatment.

The waste water treatment method accumulates the ammonium oxidizing bacteria in activated sludge with higher priority by subjecting the activated sludge to the alkali treatment of controlling the pH to 10 or higher, and can thereby stop the nitrification reaction of ammonium nitrogen at the stage of nitrite. Thereby, the method can reduce the quantity of oxygen to be supplied in the nitrification reaction and the quantity of a hydrogen donor to be supplied in the reduction reaction.

In the step of subjecting the nitrite to the denitrification treatment in the waste water treatment method, the nitrite which has been formed in the step of oxidizing the ammonium nitrogen may be denitrified by anaerobic ammonium oxidizing bacteria while using the ammonium nitrogen contained in the waste water as a hydrogen donor.

In the step of subjecting the nitrite to the denitrification treatment in the waste water treatment method, the nitrite formed in the step of oxidizing the ammonium nitrogen may be denitrified by denitrifying bacteria.

The waste water treatment method preferably further includes the steps of: recovering the activated sludge used in the step of oxidizing the ammonium nitrogen to the nitrite, and subjecting the recovered activated sludge to the alkali treatment.

Thereby, even when the nitrite oxidizing bacteria are brought in from the outside, the nitrite type nitrification performance can be maintained for a long period of time.

The waste water treatment method preferably further includes the step of adjusting the pH of the activated sludge which has been subjected to the alkali treatment, by adding an acid agent to the activated sludge.

Thus, by lowering the pH of the activated sludge after the alkali treatment through the addition of the acid agent, the efficiency of the waste water treatment can be prevented from lowering.

A waste water treatment apparatus according to the present invention is an apparatus for treating a waste water containing ammonium nitrogen, and includes: an alkali treatment apparatus which subjects an activated sludge containing at least ammonium oxidizing bacteria and nitrite oxidizing bacteria to an alkali treatment therein so that the pH of the activated sludge can be 10 or higher; a nitrite-forming tank in which the ammonium nitrogen contained in the waste water is oxidized to nitrite with the activated sludge which has been subjected to the alkali treatment; and a denitrification tank in which the nitrite is subjected to denitrification treatment.

In the denitrification tank in the waste water treatment apparatus, the nitrite which has been formed in the nitrite-forming tank may be denitrified by anaerobic ammonium oxidizing bacteria, while using the ammonium nitrogen contained in the waste water as a hydrogen donor.

In the denitrification tank in the waste water treatment apparatus, the nitrite which has been formed in the nitrite-forming tank may be denitrified by denitrifying bacteria.

The waste water treatment apparatus preferably further includes a recovery apparatus which recovers the activated sludge from the nitrite-forming tank, and a regeneration apparatus which subjects the activated sludge which has been recovered by the recovery apparatus to the alkali treatment therein to regenerate the activated sludge.

The waste water treatment apparatus preferably further includes a pH-adjusting apparatus which adjusts the pH of the activated sludge by adding an acid agent to the activated sludge which has been subjected to the alkali treatment.

The production method according to the present invention can accumulate ammonium oxidizing bacteria in activated sludge with higher priority, by subjecting the activated sludge to the alkali treatment of controlling the pH to 10 or higher, and thereby deactivating nitrite oxidizing bacteria. Thereby, the treatment method can stop the nitrification reaction of ammonium nitrogen in waste water in a stage of nitrite, and reduce the quantity of oxygen to be supplied in the nitrification reaction and the quantity of a hydrogen donor to be supplied in the reduction reaction.

The alkali treatment can be conducted at a lower cost than that of heat treatment for the carrier, and can reduce the energy cost.

The production method also can prevent a rate of the nitrification reaction from decreasing due to the damage of the carrier, by accumulating the ammonium oxidizing bacteria not on the carrier but in the activated sludge, and accordingly can omit a complicated process for recovering the carrier.

Furthermore, the production method can omit the neutralization treatment, because even though the activated sludge which had been subjected to the alkali treatment was discharged into the nitrification reaction tank without being neutralized, the rate of the nitrification reaction does not decrease.

BRIEF DESCRIPTION OF THE DRAWINGS

FIG. 3 is a table showing a water quality of a synthetic waste water which has been used in a first waste water treatment experiment;

FIGS. 4A to 4D are graphs showing nitrogen concentrations in treated water on the condition of the first waste water treatment experiment, in which FIGS. 4A to 4C show the concentrations of nitrogen in cases in which respective sludges A to C in the present invention have been used, and FIG. 4D shows the concentration of nitrogen in the case in which comparative sludge has been used;

FIG. 5A is a table showing a water quality of synthetic waste water containing 44 mg/L of nitrite nitrogen, and FIG. 5B is a table showing a water quality of synthetic waste water containing 44 mg/L of ammonium nitrogen;

DETAILED DESCRIPTION OF THE PREFERRED EMBODIMENTS

The embodiments according to the present invention will be described below with reference to the attached drawings.

The nitrite type nitrification-reactive sludge according to the present invention is an activated sludge in which ammonium oxidizing bacteria that oxidize ammonium nitrogen to nitrite have been accumulated with higher priority.

Figure 1:
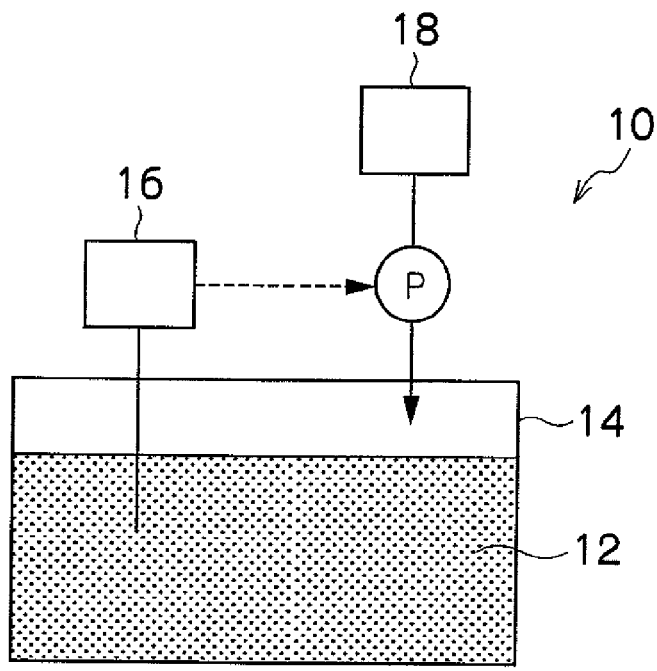
FIG. 1 is a block diagram illustrating one example of an apparatus for producing a nitrite type nitrification-reactive sludge (apparatus for producing reactive sludge) according to the present invention.

FIG. 1 is a block diagram illustrating one example of an apparatus for producing a nitrite type nitrification-reactive sludge (apparatus for producing reactive sludge). As is illustrated in the figure, a reactive sludge production apparatus 10 includes an alkali treatment tank 14 which stores an activated sludge 12 therein, a pH-measuring instrument 16 for measuring the pH of the activated sludge 12, and a pump P which supplies an alkaline liquid stored in an alkaline liquid tank 18 to the alkali treatment tank 14 based on the measured result by the pH-measuring instrument 16.

The activated sludge 12 is a composite microorganism-based sludge containing at least ammonium oxidizing bacteria and nitrite oxidizing bacteria, and can employ, for instance, an activated sludge in a disposal plant which treats sewage and industrial waste water, sludge in the bottom of a lake, a river and a sea, a soil of the surface of the ground and the like.

The pH of the activated sludge 12 is always measured with the pH-measuring instrument 16, and the quantity of the alkaline liquid to be supplied to the alkali treatment tank 14 by a pump P is adjusted based on the measured result by the pH-measuring instrument 16. Thereby, the alkali treatment of controlling the pH to the pH of 10 or higher is conducted on the activated sludge 12. Here, the phrase "pH is 10 or higher" includes not only the case where the pH is 10 or higher but lower than 14, but also the case where the pH is 14 or higher which is hardly measured by a general pH meter. For instance, even when the activated sludge 12 is introduced into a 2 normal solution of sodium hydroxide, which should theoretically show a higher pH than 14, the ammonium oxidizing bacteria in the activated sludge 12 can be reactivated by neutralizing the activated sludge 12 after having been subjected to the alkali treatment and leaving the resultant sludge for a fixed period of time.

As a result of an extensive investigation made by the present inventor, it became clear that the ammonium oxidizing bacteria have high resistance to alkali, while the nitrite oxidizing bacteria have low resistance to alkaline. The apparatus 10 for producing the reactive sludge having the above described configuration uses the difference between the alkali resistances of the ammonium oxidizing bacteria and the nitrite oxidizing bacteria described above, and can produce a reactive sludge having the ammonium oxidizing bacteria accumulated therein with higher priority by subjecting activated sludge 12 to the alkali treatment of controlling the pH to 10 or higher and thereby deactivating the nitrite oxidizing bacteria.

In the alkali treatment, the activated sludge 12 is preferably controlled to a pH range of 10 or higher but 14 or lower, and more preferably to a pH range of 11 or higher but 14 or lower. Thereby, the nitrite oxidizing bacteria can be promptly pasteurized without deactivating the ammonium oxidizing bacteria.

The alkali treatment of the activated sludge 12 is preferably conducted at least on one condition among the conditions of the following (1) to (3):

(1) holding the pH of the activated sludge 12 in a range of 13 or higher for 5 minutes or longer;

(2) holding the pH of the activated sludge 12 in a range of 12 or higher but lower than 13 for 10 minutes or longer; and (3) holding the pH of the activated sludge 12 in a range of 10 or higher but lower than 12 for 60 minutes or longer.

Thereby, the alkali treatment surely deactivates the nitrite oxidizing bacteria in the activated sludge 12 and can more selectively accumulate the ammonium oxidizing bacteria therein.

It is preferable to adjust the pH of the activated sludge 12 by adding an acid agent to the activated sludge 12 after having been subjected to the alkali treatment. Thus, by lowering the pH of the activated sludge after the alkali treatment through the addition of the acid agent, the efficiency of the waste water treatment can be prevented from lowering.

FIG. 1 illustrates an example of subjecting a predetermined amount of the activated sludge 12 to the alkali treatment of a batch system. However, the activated sludge 12 may be subjected to the alkali treatment of a continuous system which passes the activated sludge 12 through an alkali treatment tank 14 at a fixed flow rate. When the activated sludge 12 is subjected to the alkali treatment in the continuous system, an alkali treatment time period (pH-holding time period) in the above described conditions of (1) to (3) can be replaced with the average staying time period of the activated sludge 12 in the alkali treatment tank 14, and the average staying time period can be applied to the alkali treatment.

FIG. 1 describes an example in which the apparatus 10 for producing the reactive sludge is independent, but the apparatus 10 for producing the reactive sludge may be incorporated into a waste water treatment apparatus to be used as one part of the waste water treatment apparatus.

Next, the configuration of a nitrification treatment apparatus will be described below which oxidizes (nitrifies) ammonium nitrogen in waste water to nitrite with the use of the nitrite type nitrification-reactive sludge produced in the apparatus 10 having the above described configuration for producing the reactive sludge.

Figure 2:
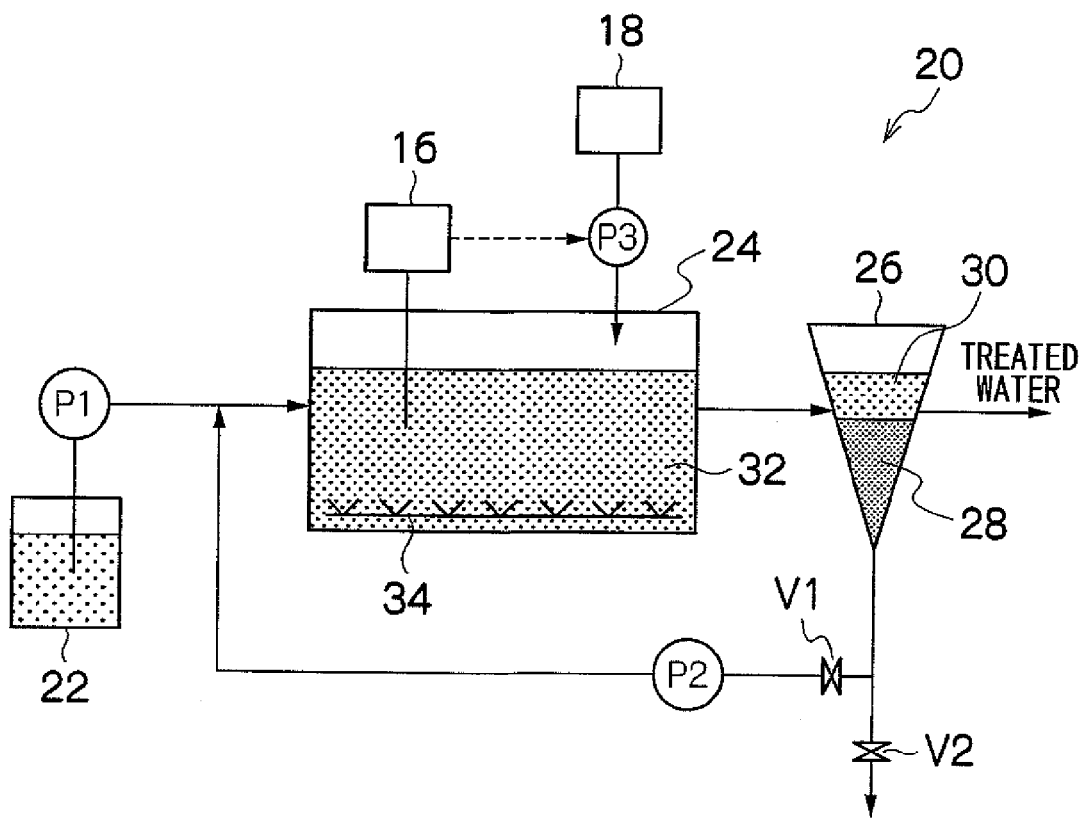
FIG. 2 is a block diagram illustrating one example of a nitrification treatment apparatus with the use of a nitrite type nitrification-reactive sludge.

FIG. 2 is a block diagram illustrating one example of a nitrification treatment apparatus with the use of a nitrite type nitrification-reactive sludge. A nitrification treatment apparatus 20 mainly comprises: a source water tank 22 which stores waste source water therein; an aerobic reaction tank (nitrite-forming tank) 24 in which the waste source water flowing from the source water tank 22 is subjected to nitrification treatment; and a sedimentation tank 26 in which a reactive sludge (nitrite type nitrification-reactive sludge) 28 is separated from the waste water (treated water 30) which has been subjected to the nitrification treatment.

A pump P1 (source water pump) which sends the waste source water to the aerobic reaction tank 24 is provided in between the source water tank 22 and the aerobic reaction tank 24, and a pump P2 (sludge-returning pump) which returns the reactive sludge 28 to the aerobic reaction tank 24 is provided in between the sedimentation tank 26 and the aerobic reaction tank 24.

In the aerobic reaction tank 24, a mixture solution 32 is collected which is the mixture of the source waste water that has been sent from the source water tank 22 by the pump P1 and the reactive sludge 28 that has been returned from the sedimentation tank 26 by the pump P2, and the mixture solution 32 is aerated and stirred by an air diffuser 34 which is provided in the aerobic reaction tank 24. This air diffuser 34 has a configuration of making air spouted from a plurality of holes provided in a cylindrical pipe, for instance, uniformly stirs the mixture solution 32, and also supplies oxygen necessary for the nitrification treatment to the aerobic reaction tank 24.

The pH of the mixture solution 32 in the aerobic reaction tank 24 is always (or periodically) measured with a pH-measuring instrument 16, and an alkaline liquid is supplied into the aerobic reaction tank 24 from the alkaline liquid tank 18 by the pump P3 based on a value measured with the pH-measuring instrument 16. Thereby, the pH of the mixture solution 32 can be adjusted within a predetermined range.

In the aerobic reaction tank 24 having the above described configuration, ammonium nitrogen in the mixture solution 32 is oxidized (nitrified) to nitrite by ammonium oxidizing bacteria which have been brought together with the reactive sludge 28.

The mixture solution 32 which has been subjected to the nitrification treatment in the aerobic reaction tank 24 is sent to the sedimentation tank 26, and is separated into the reactive sludge 28 and treated water 30. The reactive sludge 28 and the treated water 30 in the sedimentation tank 26 can be separated with an arbitrary technique. FIG. 2 illustrates an example of separating the reactive sludge 28 from the treated water 30 by using a difference between specific gravities of the reactive sludge 28 and the treated water 30.

The reactive sludge 28 which has been gravitationally sedimented in the sedimentation tank 26 is extracted from the lower part of the sedimentation tank 26, and the treated water 30 which is a supernatant liquid is discharged from the sedimentation tank 26.

Afterward, the reactive sludge 28 is returned to the aerobic reaction tank 24 again by operating the pump P2 in a state of opening a sludge-returning valve V1. The whole amount of the reactive sludge 28 in the nitrification treatment apparatus 20 can be adjusted by opening/closing a sludge-drawing valve V2.

A first waste water treatment experiment according to the following method was conducted, in order to confirm the nitrite type nitrification performance of the nitrite type nitrification-reactive sludge produced with the apparatus 10 for producing the reactive sludge, by using the nitrification treatment apparatus 20 having the above described configuration.

A synthetic waste water of which the concentration of ammonium nitrogen was adjusted to 40 mg/L was used as the waste water which was an object for nitrification treatment. FIG. 3 is a table showing a water quality of the synthetic waste water which is the object of the nitrification treatment.

Reactive sludges (sludges A to C and comparative sludge) used as the reactive sludge 28 were prepared by subjecting a returned sludge (having concentration of activated sludge suspended solid (MLSS concentration: Mixed Liquor Suspended Solid) in an amount of 6,000 mg/L) which had been collected in the waste water treatment plant, to the alkali treatment and the neutralization treatment on the following conditions.

The sludge A of the present invention was produced by holding the pH of the above described returned sludge in a range of 13.4 to 13.6 for 20 minutes, and then adding an acid agent to neutralize the alkali-treated sludge to the pH of 7.5.

The sludge B of the present invention was produced by holding the pH of the above described returned sludge in a range of 11.9 to 12.1 for 60 minutes, and then adding the acid agent to neutralize the alkali-treated sludge to the pH of 7.5.

The sludge C of the present invention was produced by holding the pH of the above described returned sludge in a range of 10.9 to 11.1 for 120 minutes, and then adding the acid agent to neutralize the alkali-treated sludge to the pH of 7.5.

The comparative sludge was produced by holding the pH of the above described returned sludge in a range of 7.4 to 7.6 for 60 minutes.

For the alkali treatment and the neutralization treatment, a solution of 1 mol/L sodium hydroxide and a solution of 1 mol/L sulfuric acid were used.

The aerobic reaction tank 24 had a reaction volume of 2 L, and was intentionally operated so that the MLSS concentration in the aerobic reaction tank 24 could be 2,500 to 3,500 mg/L. The water temperature in the aerobic reaction tank 24 was adjusted to 18 to 22° C. (20° C. by average). The hydrological staying time period of the waste water in the aerobic reaction tank 24 was set at 3 hours.

The quantity of the air to be spouted from the air diffuser 34 was adjusted so that the concentration of dissolved oxygen (DO: Dissolved oxygen) in the aerobic reaction tank 24 could be 4.0 mg/L or more, with which a nitrate type nitrification reaction easily occurs, for the purpose of easily evaluating the nitrite type nitrification reaction performance.

The quantity of the alkaline liquid to be added with the pump P3 was intentionally adjusted so that the pH in the aerobic reaction tank 24 could be 7.0 or higher but 7.5 or lower with which the nitrate type nitrification reaction easily occurs, for the purpose of easily evaluating the nitrite type nitrification performance.

Figure 4A:
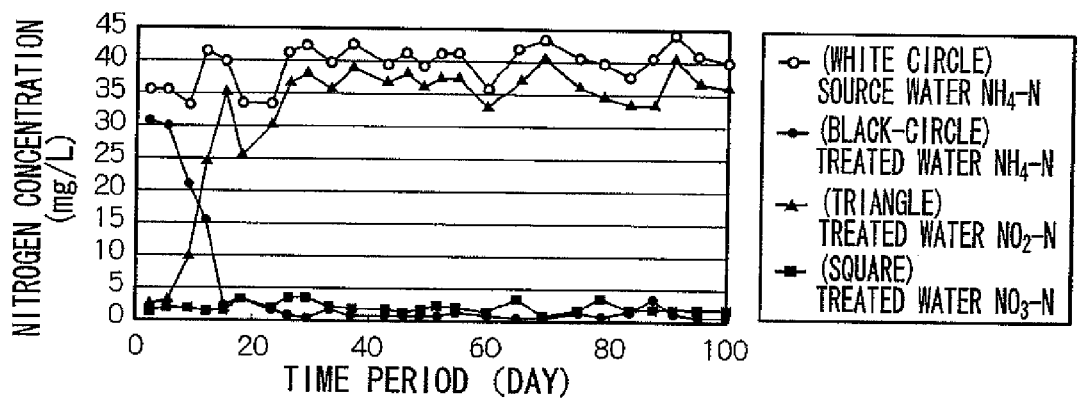
Figure 4B:
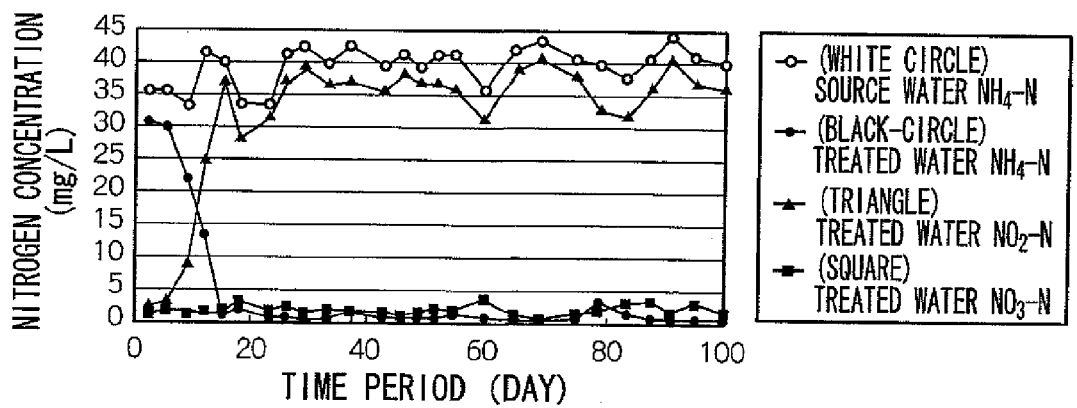
Figure 4C:
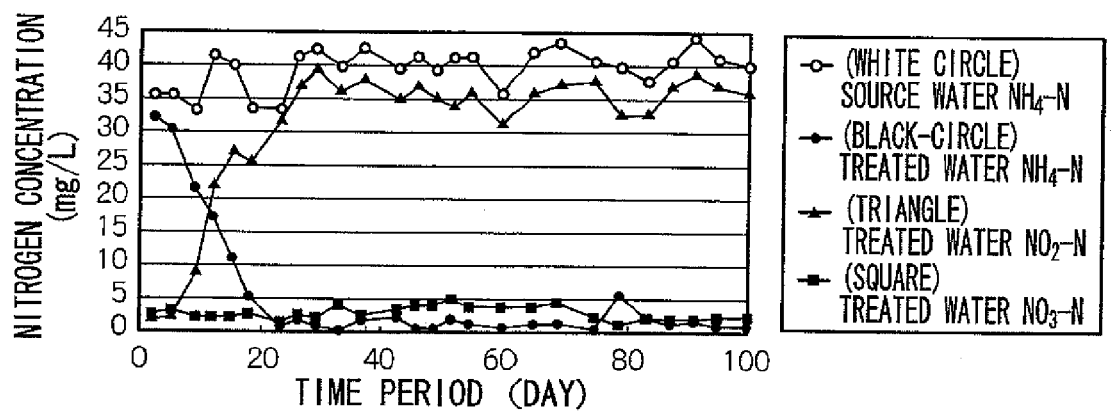
Figure 4D:
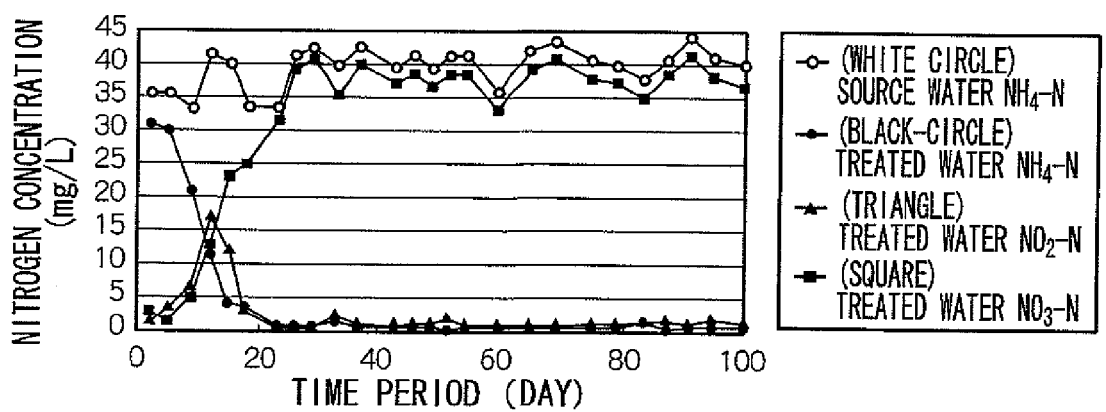

FIGS. 4A to 4D are graphs showing the concentrations of nitrogen in treated water 30 on the above described conditions, in which FIGS. 4A to 4C show the concentrations of nitrogen in cases in which respective sludges A to C of the present invention were used, and FIG. 4D shows the concentration of nitrogen in the case in which the comparative sludge was used. In FIGS. 4A to 4D, "white-circle" marks represent the concentration of ammonium nitrogen in the waste source water, "black-circle" marks represent the concentration of ammonium nitrogen in the treated water 30, "triangle" marks represent the concentration of nitrite nitrogen in the treated water 30, and "square" marks represent the concentration of nitrate nitrogen in the treated water 30.

As is illustrated in FIGS. 4A to 4C, in the waste water treatment with the use of the sludges A to C of the present invention, the ammonium oxidation activity rose from the first week after the start, and the nitrite production capacity was confirmed to be 90% or more by a nitrite formation rate on the third week. After that, the nitrification treatment of the synthetic waste water was continued for 2 months or longer, but the nitrate production capacity did not rise. Thus, it was found that the nitrite type nitrification reaction occurred in the aerobic reaction tank 24 by using the reactive sludge 28 produced with the production method according to the present invention.

On the other hand, as is illustrated in FIG. 4D, in the waste water treatment with the use of the comparative sludge, only the nitrite production capacity rose in two weeks right after the operation started, but the nitrate production capacity rose afterwards, and the nitrate production capacity was confirmed to be 90% or more by a nitrate formation rate on the third week and later. Afterward, the waste water treatment was conducted for 2 months or longer, but it was not confirmed that the nitrate production capacity was reduced.

As was described above, it was confirmed that the reactive sludge 28 having the nitrite type nitrification performance can be produced by subjecting an activated sludge containing at least ammonium oxidizing bacteria and nitrite oxidizing bacteria to an alkali treatment of controlling the pH to 10 or higher.

Next, the second waste water treatment experiment according to the following method was conducted in order to examine a relationship between the alkali treatment condition when a reactive sludge 28 was produced and the nitrite type nitrification performance of the reactive sludge 28.

A used nitrite type nitrification-reactive sludge was a sludge (collected in waste water treatment plant) which had had the MLSS concentration of 6,000 mg/L and had been subjected to the alkali treatment and the neutralization treatment, similarly to that in the first waste water treatment experiment. The alkali treatment of the sludge was conducted on the conditions in which the pH was 8, 9, 10, 11, 12, 13, 13.5 or 14, and the treatment time period (minute) was 0.5, 1, 3, 5, 10, 20, 40 or 60. Then, the sludge after the alkali treatment was promptly neutralized to the pH of 7.5 with an acid liquid.

Figures 5A, 5B, 6:
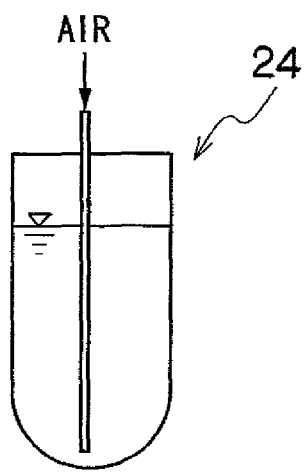
FIGS. 5A and 5B are tables showing water qualities of synthetic waste waters which have been used in a second waste water treatment experiment.
FIG. 6 is a block diagram illustrating an aerobic reaction tank which has been used in the second waste water treatment experiment.

Used synthetic waste waters which were an objective for nitrification treatment were a synthetic waste water containing 44 mg/L of nitrite nitrogen, and a synthetic waste water containing 44 mg/L of ammonium nitrogen. FIG. 5A is a table showing a water quality of the synthetic waste water containing 44 mg/L of the nitrite nitrogen, and FIG. 5B is a table showing a water quality of the synthetic waste water containing 44 mg/L of the ammonium nitrogen.

Each 450 mL of those synthetic waste waters and each 50 mL of the above described nitrite type nitrification-reactive sludges were charged into an aerobic reaction tank 24 illustrated in FIG. 6, and were subjected to continuous aeration treatment on the condition of the water temperature of 20° C. and the aeration flow rate of 300 mL/min. In consideration of the evaporation of the reaction liquid in the aerobic reaction tank 24, the aeration was stopped once a day to deposit the active sludge, and such a cultivation for half batch was conducted in which 400 mL of the supernatant liquid was replaced with respective culture mediums.

Figure 7A:
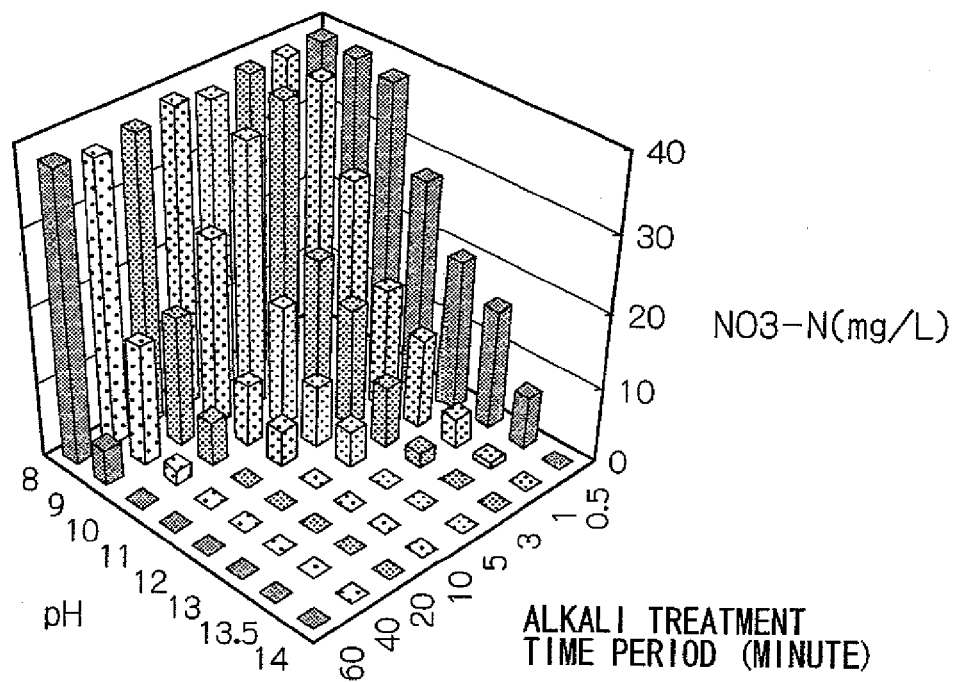
FIG. 7A is a graph showing a concentration of nitrite nitrogen in a supernatant liquid obtained by subjecting the synthetic waste water (see FIG. 5A) containing 44 mg/L of the nitrite nitrogen to continuous aeration treatment for one month.
Figure 7B:
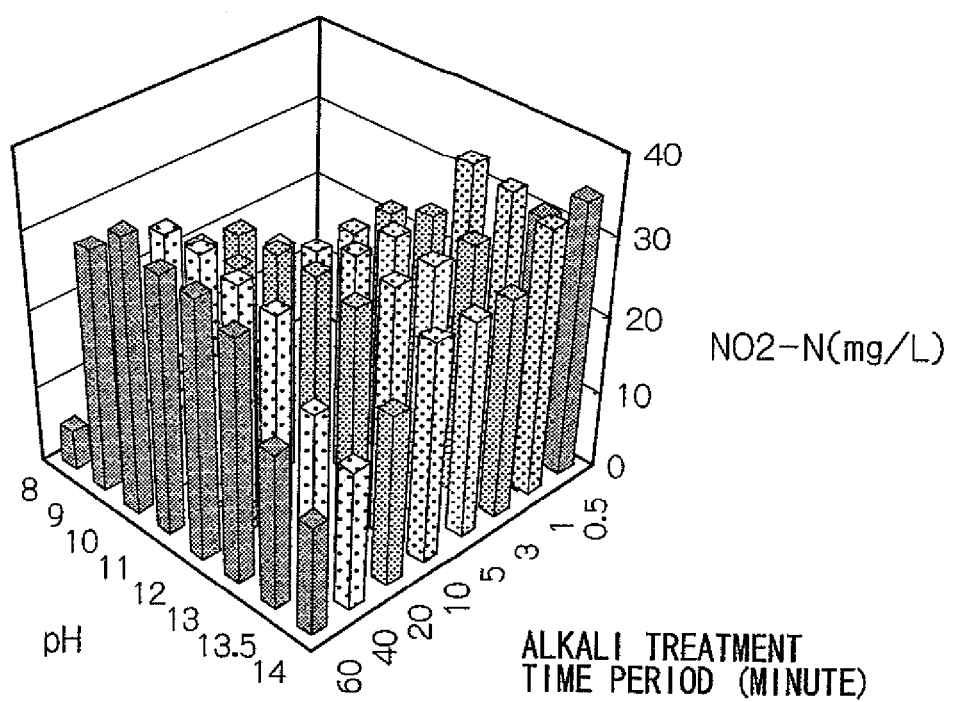
FIG. 7B is a graph showing a concentration of nitrate nitrogen in a supernatant liquid obtained by subjecting the synthetic waste water (see FIG. 5B) containing 44 mg/L of the ammonium nitrogen to continuous aeration treatment for one month.

FIG. 7A is a graph showing the concentration of nitrate nitrogen in a supernatant liquid obtained by subjecting the synthetic waste water containing 44 mg/L of the nitrite nitrogen (see FIG. 5A) to the continuous aeration treatment for one month, and FIG. 7B is a graph showing the concentration of the nitrate nitrogen in a supernatant liquid obtained by subjecting the synthetic waste water containing 44 mg/L of the ammonium nitrogen (see FIG. 5B) to the continuous aeration treatment for one month.

It was found from FIGS. 7A and 7B that the reactive sludge which could promote the production of nitrite while inhibiting the production of nitrate could be produced by subjecting activated sludge to the alkali treatment of the following (1) to (3) conditions:

(1) holding the pH of the activated sludge in a range of 13 or higher for 5 minutes or longer;

(2) holding the pH of the activated sludge in a range of 12 or higher but lower than 13 for 10 minutes or longer; and (3) holding the pH of the activated sludge in a range of 10 or higher but lower than 12 for 60 minutes or longer.

Next, the configuration of the nitrification treatment apparatus for stably maintaining the nitrite type nitrification performance of the nitrite type nitrification-reactive sludge for a long period of time will be described.

In the above described first waste water treatment experiment and second waste water treatment experiment, synthetic waste water was used as an object for nitrification treatment, so the nitrite oxidizing bacteria were not brought in from the outside, but the nitrite oxidizing bacteria are contained in an actual waste water. For this reason, when the nitrification treatment is continued for a long period of time, the nitrite oxidizing bacteria which have flowed into the aerobic reaction tank together with the waste water proliferate, and the nitrification reaction in the aerobic reaction tank may be shifted to nitrate type nitrification from the nitrite type nitrification.

For this reason, it is preferable to periodically subject the reactive sludge (nitrite type nitrification-reactive sludge) to the alkali treatment of controlling the pH to 10 or higher (preferably to 10 or higher but 14 or lower, and more preferably to 11 or higher but 14 or lower), from the viewpoint of maintaining the nitrite type nitrification performance for a long period of time.

In this case, it is preferable not to subject all reactive sludges to the alkali treatment at a time, but to recover one part of the sludge returned to the aerobic reaction tank from the sedimentation tank and periodically subject the recovered sludge to the alkali treatment. Thereby, the nitrification treatment apparatus suppresses the nitrite oxidation activity of the reactive sludge in the aerobic reaction tank for a long period of time, and can also prevent the ammonium oxidation activity from decreasing due to the lack of the ammonium oxidizing bacteria in the aerobic reaction tank. The apparatus can also reduce the quantity of the alkaline liquid to be added by subjecting the returned sludge to the alkali treatment.

Figure 8:
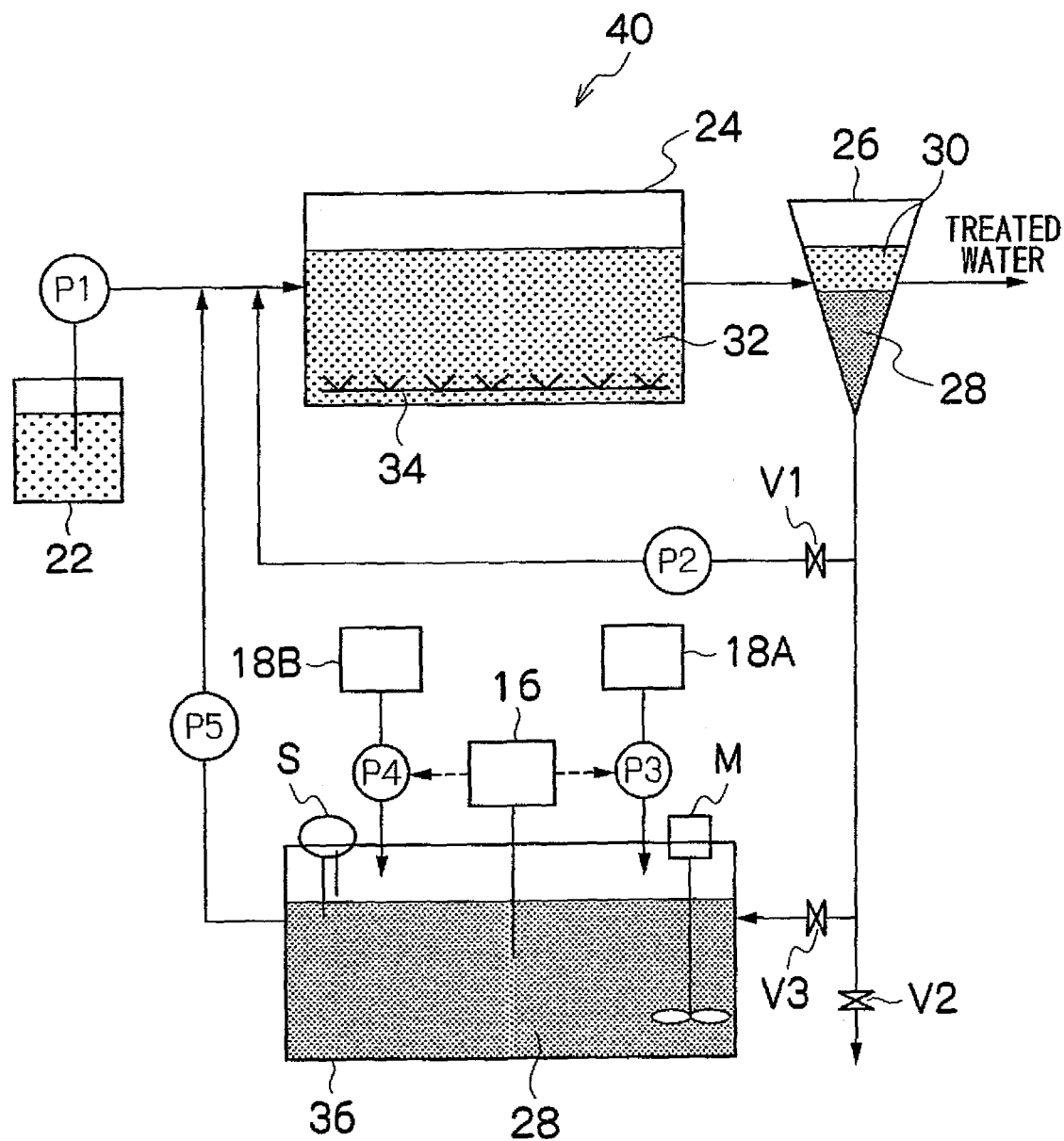
FIG. 8 is a block diagram illustrating one example of a nitrification treatment apparatus which periodically conducts the alkali treatment for the reactive sludge.

FIG. 8 is a block diagram illustrating one example of a nitrification treatment apparatus which periodically subjects the reactive sludge to the alkali treatment. As is illustrated in the figure, the nitrification treatment apparatus 40 mainly includes a regeneration treatment tank 36 in which one part of the reactive sludge 28 to be returned to the aerobic reaction tank 24 from the sedimentation tank 26 is subjected to the alkali treatment, and in this point, is different from the nitrification treatment apparatus 20 illustrated in FIG. 2. Among the components of the nitrification treatment apparatus 40, on common factors with the nitrification treatment apparatus 20, common numerals will be given and overlapping descriptions thereon will be omitted.

The reactive sludge 28 which has been separated from treated water in the sedimentation tank 26 of the nitrification treatment apparatus 40 is returned to the aerobic reaction tank 24 by the power of a pump P2 in a state in which a sludge-returning valve V1 is opened. At this time, one part of the reactive sludge 28 to be returned from the sedimentation tank 26 is sent to the regeneration treatment tank 36 with an operation of opening a recovered sludge valve V3.

The opening/closing of the recovered sludge valve V3 is preferably adjusted so that the water level of the reactive sludge 28 in the regeneration treatment tank 36 can be kept constant. For instance, the water level of the reactive sludge 28 can be adjusted to be constant by detecting the water level of the reactive sludge 28 with a water level sensor S provided on the regeneration treatment tank 36, and switching opening/closing of the recovered sludge valve V3 based on the detected result by the water level sensor S.

The pH of the reactive sludge 28 in the regeneration treatment tank 36 is always (or periodically) measured by a pH-measuring instrument 16, and the pH of the reactive sludge 28 is adjusted on the basis of the measured value by the pH-measuring instrument 16. Specifically, the pH of the reactive sludge 28 can be adjusted within a desired range by operating the pump P3 to add an alkaline liquid to the regeneration treatment tank 36 from the alkaline liquid tank 18A based on a measurement result of the pH-measuring instrument 16, or by operating a pump P4 to add an acid liquid from an acidic liquid tank 18B. In addition, when adjusting the pH of the reactive sludge 28, it is preferable to stir the reactive sludge 28, for instance, with a stirrer M provided on the regeneration treatment tank 36, from the viewpoint of accurately adjusting the pH.

The regeneration treatment tank 36 having the above described configuration makes the recovered reactive sludge 28 subjected to the alkali treatment (regeneration treatment) of controlling the pH to 10 or higher (preferably to 10 or higher but 14 or lower, and more preferably to 11 or higher but 14 or lower), and can make the reactive sludge 28 recover its nitrite type nitrification performance.

At this time, the alkali treatment (regeneration treatment) for the recovered reactive sludge 28 can be conducted at least on one condition among the conditions of the following (1) to (3):

(1) holding the pH of the reactive sludge 28 in a range of 13 or higher for 5 minutes or longer;

(2) holding the pH of the reactive sludge 28 in a range of 12 or higher but lower than 13 for 10 minutes or longer; and (3) holding the pH of the reactive sludge 28 in a range of 10 or higher but lower than 12 for 60 minutes or longer.

The reactive sludge 28 which has been subjected to the alkali treatment (regeneration treatment) in the regeneration treatment tank 36 is then preferably neutralized by the addition of an acid liquid sent from the acidic liquid tank 18B. The reactive sludge 28 is then returned to the aerobic reaction tank 24 with the power of a pump P5 (regenerated-sludge-returning pump).

Incidentally, FIG. 8 described an example (of batch system) of collecting a predetermined amount of the reactive sludge 28 in the regeneration treatment tank 36, and subjecting the reactive sludge 28 to the alkali treatment (batch system), but the alkali treatment for the reactive sludge 28 may be conducted in a continuous system. When the alkali treatment is conducted in the continuous system, the treatment time period (pH-holding time period) in the above described conditions of (1) to (3) can be replaced with the average staying time period of the reactive sludge 28 in the regeneration treatment tank 36, and the average staying time period can be applied to the alkali treatment.

Next, a third waste water treatment experiment will be described below which was conducted in order to confirm the long-duration stability of the nitrite type nitrification performance with the nitrification treatment apparatus 40 having the above described configuration.

Firstly, the synthetic waste water having the water quality shown in FIG. 3 was subjected to the nitrification treatment with the use of the sludge A of the present invention, which was used in the first waste water treatment experiment, until the composition has reached a steady state.

Figures 9, 10:
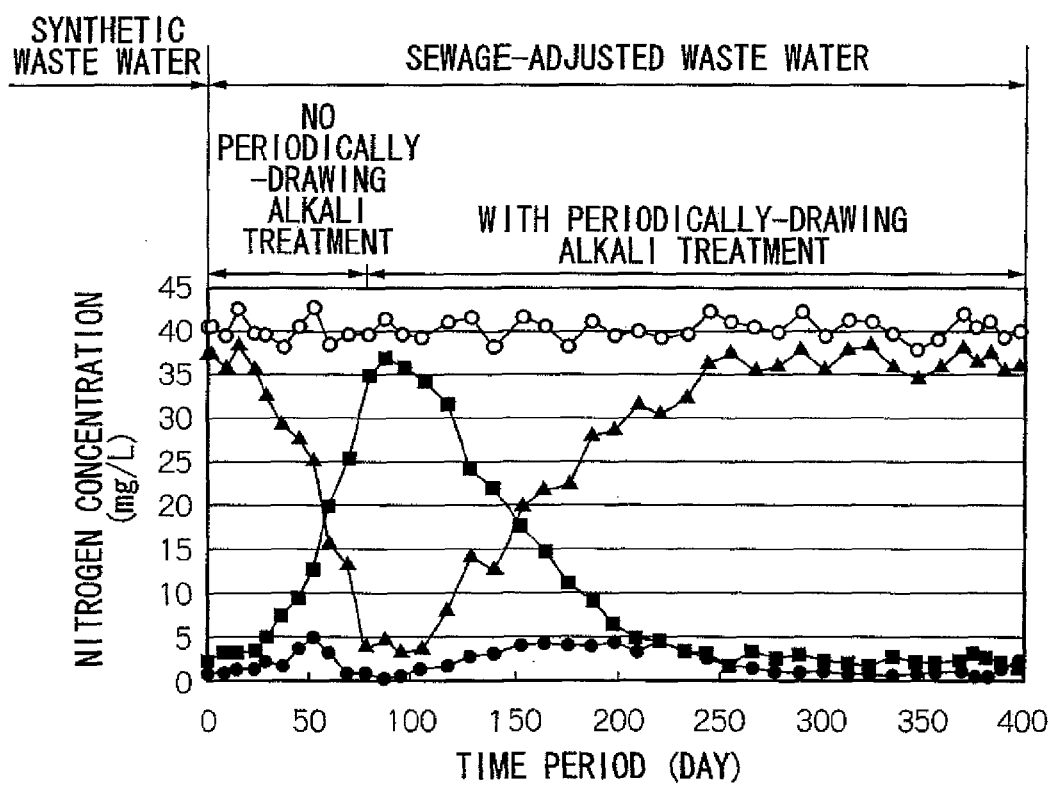
FIG. 9 is a table showing an average water quality of a waste water which has been used in a third waste water treatment experiment.
FIG. 10 is a graph showing a concentration of nitrogen in treated water on the condition of the third waste water treatment experiment.

After this, the waste water which is the object of the treatment was changed to the sewage-adjusted waste water of which the concentration of ammonium nitrogen was adjusted to be 40 mg/L by the addition of $NH_4Cl$ to the sewage-treated water. FIG. 9 is a table showing the average water quality of the sewage-adjusted waste water which is the object of the nitrification treatment.

When the waste water which is the object of the nitrification treatment is changed to the sewage-adjusted waste water from the synthetic waste water, the nitrite oxidizing bacteria which flow into the aerobic reaction tank 24 together with the sewage-adjusted waste water proliferate, and the nitrification reaction in the aerobic reaction tank 24 is shifted to nitrate type nitrification from the nitrite type nitrification.

In the present waste water treatment experiment, the effect of the alkali treatment (regeneration treatment) in the regeneration treatment tank 36 for the reactive sludge 28 was confirmed by intentionally shifting the nitrification reaction in the aerobic reaction tank 24 to the nitrate type nitrification from the nitrite type nitrification and then changing the operation to a method of periodically subjecting one part of the returned sludge to the alkali treatment.

In addition, the reactive sludge 28 was subjected to the alkali treatment (regeneration treatment) on the conditions of drawing 30 mL of the reactive sludge 28 into the regeneration treatment tank 36 once per 12 hours, adding the alkaline liquid thereto while stirring the mixture, and maintaining the mixture at a pH of 13.4 to 13.6 for 20 minutes. After this, the acid liquid was added to the reactive sludge 28 which had been subjected to the alkali treatment, was stirred, was neutralized to the pH of 7.5, and was returned to the aerobic reaction tank 24. For the alkali treatment and the neutralization treatment, a solution of 2 mol/L sodium hydroxide and a solution of 2 mol/L sulfuric acid were used.

The reaction volume of the aerobic reaction tank 24 was 2 L, and the apparatus was operated so that the MLSS concentration in the aerobic reaction tank 24 could be 2,500 to 3,500 mg/L. The water temperature in the aerobic reaction tank 24 was adjusted to 18 to 22° C. (20° C. by average). The hydrological staying time period of the waste water in the aerobic reaction tank 24 was set at 3 hours.

The concentration of dissolved oxygen (DO; Dissolved Oxygen) in the aerobic reaction tank 24 was adjusted to 4.0 mg/L or more. In addition, the pH in the aerobic reaction tank 24 was adjusted within the range of 7.0 or higher but 7.5 or lower.

FIG. 10 is a graph showing a concentration of nitrogen in treated water 30 on the above described condition. In FIG. 10, "white-circle" marks represent the concentration of ammonium nitrogen in the waste source water, "black-circle" marks represent the concentration of ammonium nitrogen in the treated water 30, "triangle" marks represent the concentration of nitrite nitrogen in the treated water 30, and "square" marks represent the concentration of nitrate nitrogen in the treated water 30. The horizontal axis of FIG. 10 represents the elapsed days after the time point (time point of having changed waste water) when the waste water which is the object of treatment has been changed to the sewage-adjusted waste water from the synthetic waste water.

As is understood from FIG. 10, the nitrite type nitrification reaction was maintained for approximately two weeks after the waste-water-switched point, but the nitrate concentration in the treated water increased, and the nitrification reaction was shifted to the nitrate type. The periodically-drawing alkali treatment (regeneration treatment) started on the 81st day after the waste-water-switched point, but a remarkable effect of inhibiting nitrate production was not confirmed before the 108th day. However, the concentration of nitrate in the treated water started to decrease from the 117th day and decreased to 5 mg/L or less on the 209th day, and after that, the stable nitrite type nitrification reaction continued for approximately 200 days.

It was found from the above description that the nitrite type nitrification performance of the reactive sludge 28 can be maintained by subjecting the recovered reactive sludge 28 to the periodically-drawing alkali treatment (regeneration treatment).

Next, the waste water treatment method of treating the waste water containing ammonium nitrogen according to the present invention will be described below.

In the waste water treatment method according to the present invention, ammonium nitrogen in waste water is oxidized (nitrified) to nitrite with the use of a nitrite type nitrification-reactive sludge, and then the produced nitrite is subjected to denitrification treatment to be decomposed into nitrogen gas. A method for denitrifying the nitrite, for instance, a method of using denitrifying bacteria and a method of using anaerobic ammonium oxidizing bacteria can be employed.

Figure 11A:
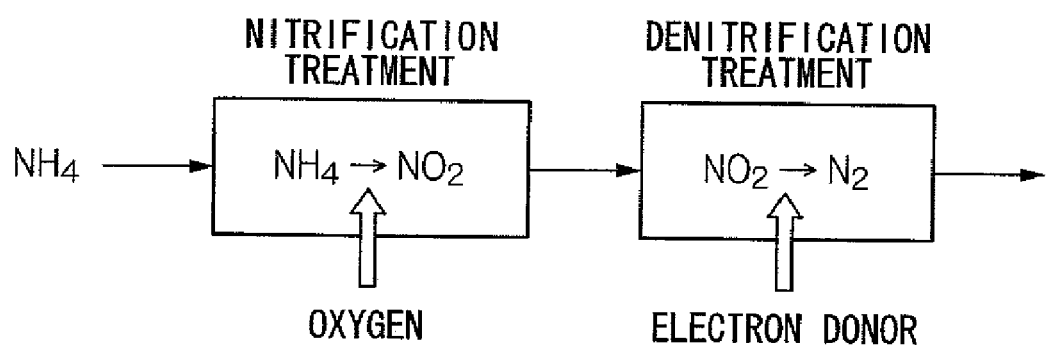
FIG. 11A is a process drawing illustrating a waste water treatment method including denitrification treatment with denitrifying bacteria.
Figure 11B:
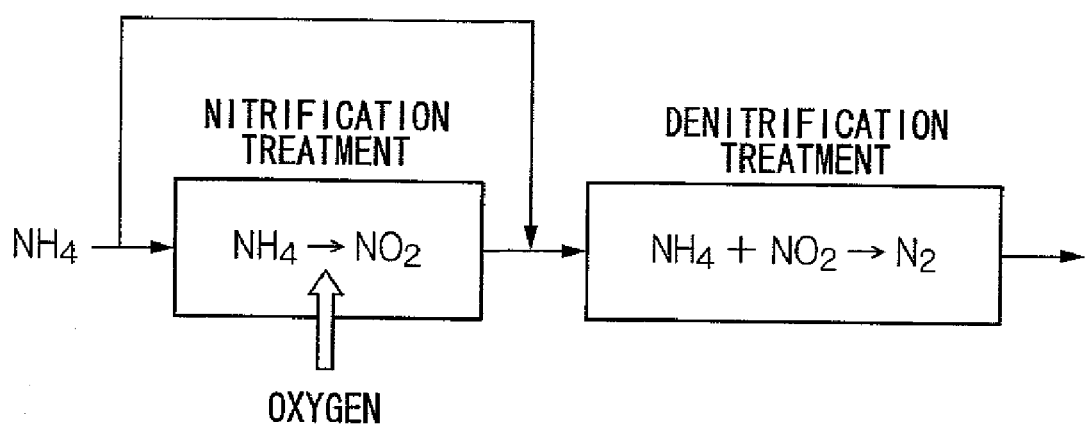
FIG. 11B is a process drawing illustrating a waste water treatment method including denitrification treatment with anaerobic ammonium oxidizing bacteria.

FIG. 11A is a process drawing illustrating a waste water treatment method including denitrification treatment with the use of denitrifying bacteria, and FIG. 11B is a process drawing illustrating a waste water treatment method including denitrification treatment with the use of anaerobic ammonium oxidizing bacteria.

The waste water treatment method (see FIG. 11A) including the denitrification treatment with the use of the denitrifying bacteria includes oxidizing the ammonium nitrogen in the waste water to nitrite, and decomposing the nitrite into nitrogen gas with the use of the denitrifying bacteria. On the other hand, the waste water treatment method (see FIG. 11B) including the denitrification treatment with the use of the anaerobic ammonium oxidizing bacteria includes oxidizing the ammonium nitrogen in the waste water to nitrite, and denitrifying the nitrite with the use of the anaerobic ammonium oxidizing bacteria. In this case, the ammonium nitrogen in the waste water is used as a hydrogen donor in the denitrification treatment.

Figure 12:
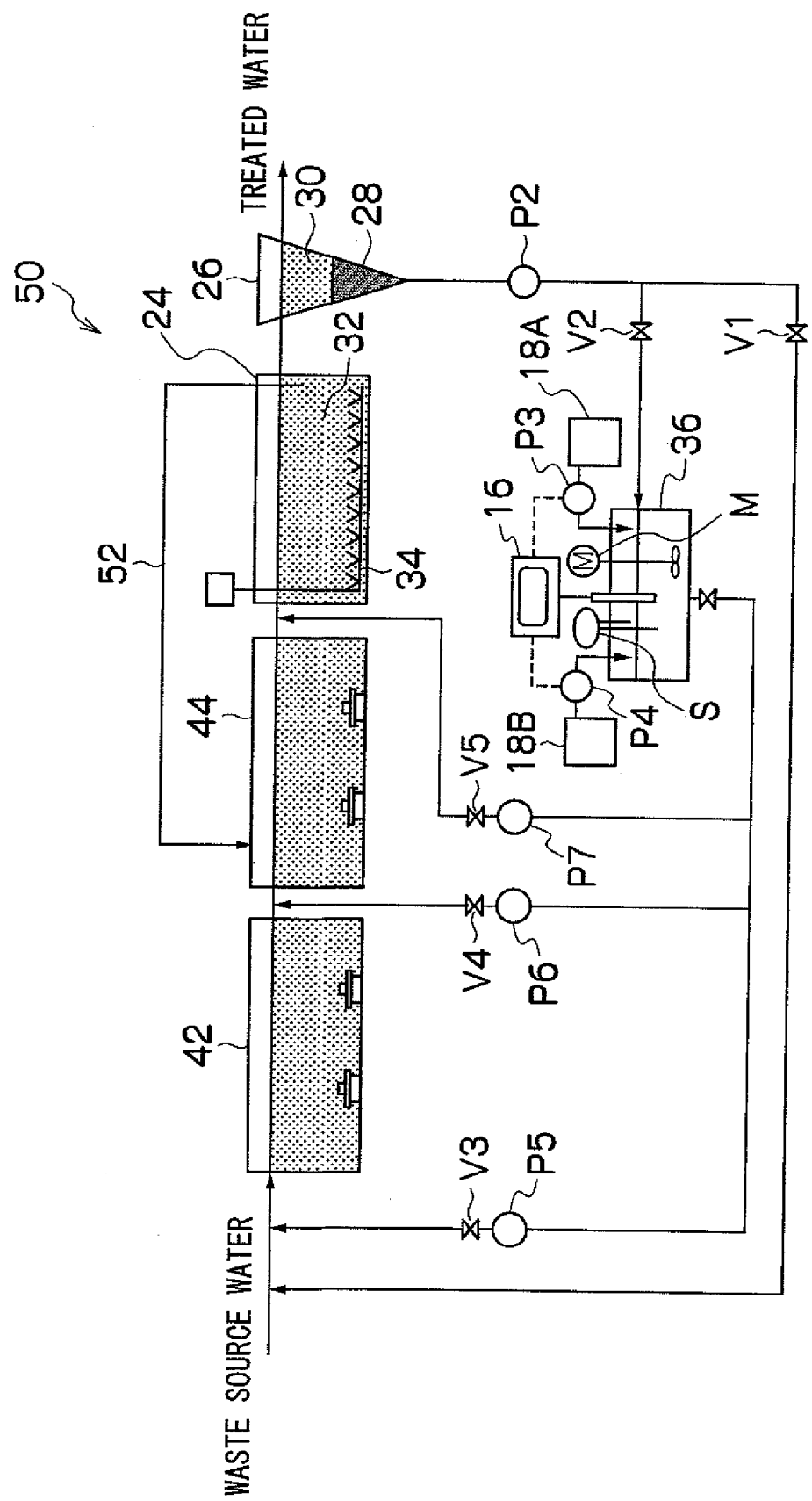
FIG. 12 is a block diagram illustrating one example of a waste water treatment apparatus for conducting a waste water treatment method according to the present invention.

FIG. 12 is a block diagram illustrating one example of a waste water treatment apparatus for conducting a waste water treatment method according to the present invention. As is illustrated in FIG. 12, the waste water treatment apparatus 50 mainly includes: an anaerobic tank 42 in which nitrogen of an organism contained in the waste source water is deaminated; an anoxia tank 44 in which nitrite is denitrified, an aerobic reaction tank 24 in which ammonium nitrogen is oxidized to nitrite, a sedimentation tank 26 in which reactive sludge 28 is separated from treated water 30, and a regeneration treatment tank 36 in which the reactive sludge 28 is subjected to alkali treatment.

In the anaerobic tank 42, nitrogen of the organism contained in the waste source water is deaminated to produce ammonium nitrogen. The ammonium nitrogen produced in the anaerobic tank 42 passes through an anoxia tank 44 immediately thereafter, and is nitrified to nitrite in the aerobic reaction tank 24.

Afterward, the waste water which has been subjected to nitrification treatment in the aerobic reaction tank 24 is returned to the anoxia tank 44 through a waste water returning pipe 52 provided in between the aerobic reaction tank 24 and the anoxia tank 44. Thereby, the nitrite in the waste water which has been returned to the anoxia tank 44 is denitrified in the anoxia tank 44, and is decomposed into nitrogen gas.

The dissolved oxygen in the source waste water is consumed in the anaerobic tank 42. Thus by maintaining the amount of dissolved oxygen in the anoxia tank 44 at a low concentration, the denitrification treatment in the anoxia tank 44 can be efficiently conducted.

One part of the reactive sludge 28 which has been separated in the sedimentation tank 26 is subjected to the alkali treatment (regeneration treatment) in the regeneration treatment tank 36, and then is returned to a stage prior to the aerobic reaction tank 24. The reactive sludge 28 which has been subjected to the alkali treatment may be returned, for instance, to the pipe just prior to the aerobic reaction tank 24, or may be returned to the pipe just prior to the anaerobic tank 42 or the anoxia tank 44. FIG. 12 illustrates an example in which a return place of the reactive sludge 28 which has been subjected to the alkali treatment can be selected from any one of the pipes just prior to the anaerobic tank 42, just prior to the anoxia tank 44 and just prior to the aerobic reaction tank 24 by opening/closing the returned sludge valves V3, V4 and V5.

Figure 13:
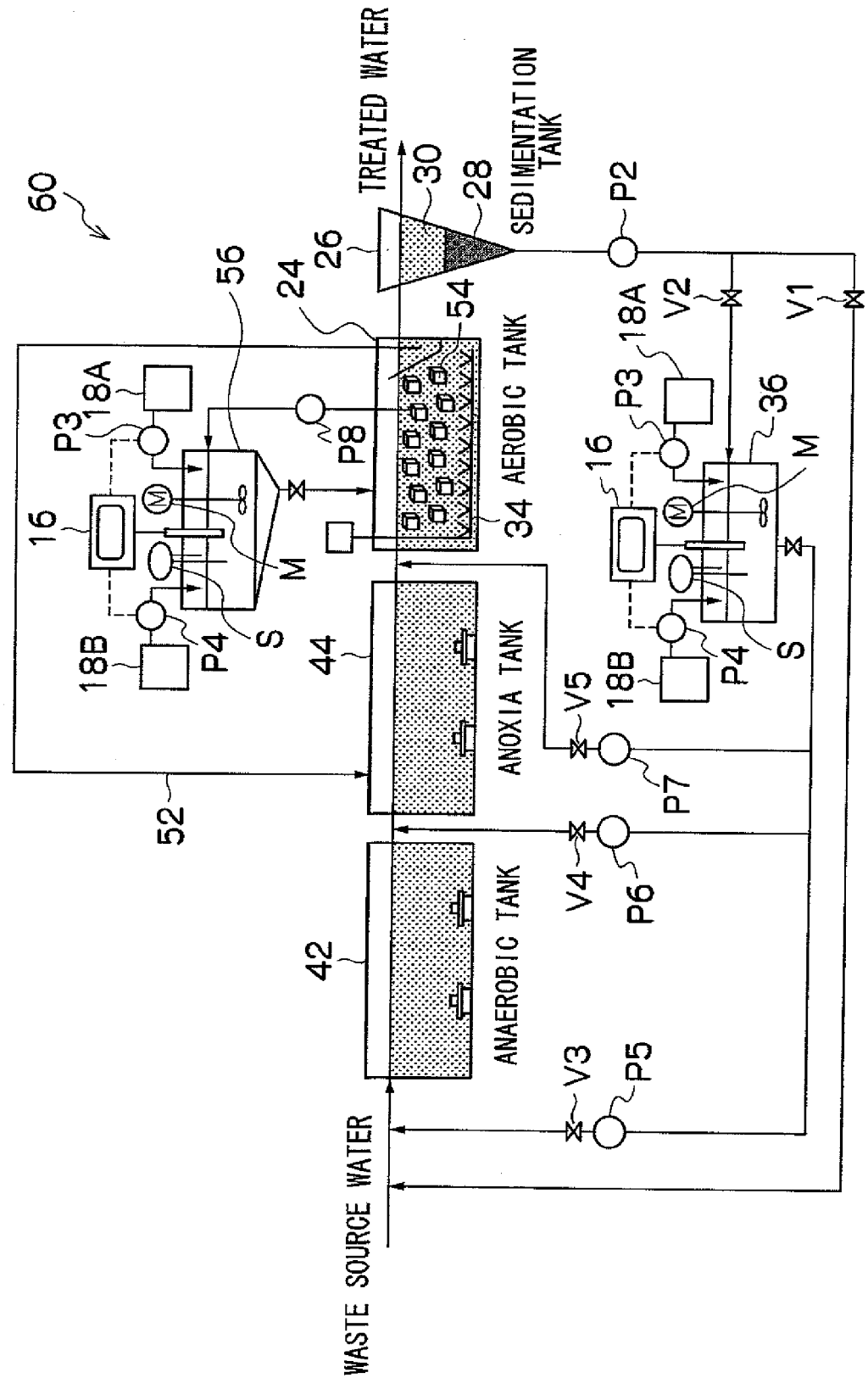
FIG. 13 is a block diagram illustrating a modified example of the waste water treatment apparatus illustrated in FIG. 12.

FIG. 13 is a block diagram illustrating a modified example of a waste water treatment apparatus 50 illustrated in FIG. 12. As is illustrated in FIG. 13, a waste water treatment apparatus 60 is different from the waste water treatment apparatus 50 illustrated in FIG. 12, in a point of having packed carriers 54 in which ammonium oxidizing bacteria have been accumulated with higher priority, in the aerobic reaction tank 24, and a point of providing a carrier regeneration treatment tank 56 in which the carriers 54 are subjected to the alkali treatment (regeneration treatment) therein.

The carriers 54 in the waste water treatment apparatus 60 can be produced, for instance, by subjecting a composite microorganism-based sludge containing ammonium oxidizing bacteria and nitrite oxidizing bacteria to heat treatment and alkali treatment or acid treatment. Specifically, the carriers 54 can be produced by subjecting the above described composite microorganism-based sludge to a heat treatment of 40° C. or higher but 100° C. or lower, and an alkali treatment of controlling the pH to 10 or higher (preferably to 10 or higher but 14 or lower and more preferably to 11 or higher but 14 or lower), or an acid treatment of controlling the pH to 6 or lower (preferably acid treatment of controlling the pH to 0.5 or higher but 5 or lower).

The nitrite type nitrification performance of the carriers 54 deteriorates while having been used for a long period of time, so the carriers 54 are preferably periodically subjected to alkali treatment (regeneration treatment) in the carrier regeneration treatment tank 56.

In the carrier regeneration treatment tank 56, the carriers 54 in the aerobic reaction tank 24 is periodically extracted with a pump P8 and are subjected to the alkali treatment (regeneration treatment). The alkali treatment (regeneration treatment) for the carriers 54 is conducted by adding an alkaline liquid sent from the alkaline liquid tank 18A into the carrier regeneration treatment tank 56, on the basis of a measured result by the pH-measuring instrument 16. A condition to be used in this alkali treatment can be similar to that used in the alkali treatment for the reactive sludge 28 in a regeneration treatment tank 36, which has been described already.

The waste water treatment apparatus 60 having the above described configuration uses the reactive sludge 28 and the carriers 54 in combination for conducting nitrification treatment in the aerobic reaction tank 24, and accordingly can efficiently oxidize (nitrify) ammonium nitrogen in the waste water to nitrite.

Figure 14:
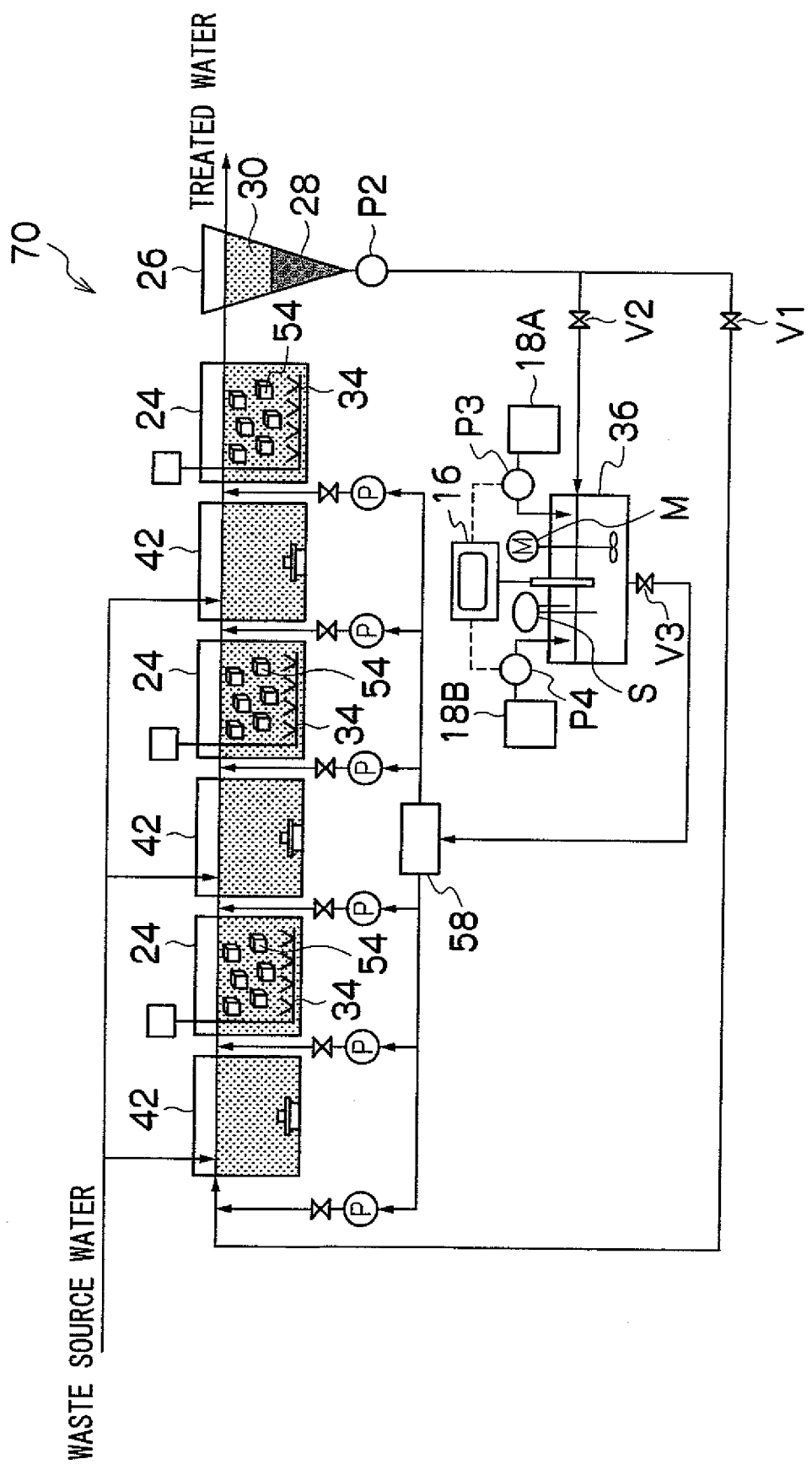
FIG. 14 is a block diagram illustrating another modified example of the waste water treatment apparatus illustrated in FIG. 12.

FIG. 14 is a block diagram illustrating another modified example of a waste water treatment apparatus 50 illustrated in FIG. 12. As is illustrated in FIG. 14, a waste water treatment apparatus 70 is different from the waste water treatment apparatus 50 illustrated in FIG. 12, in a point of adopting a multistage type treatment method in which a plurality of anaerobic tanks 42 and aerobic reaction tanks 24 are aligned in series, and a point of providing a distributor 58 for distributing and returning the reactive sludge 28 which has been subjected to alkali treatment (regeneration treatment) in a regeneration treatment tank 36 to pipes just prior to each tank.

The waste water treatment apparatus 70 arranges the plurality of the anaerobic tanks 42 and the aerobic reaction tanks 24 therein, and thereby can reduce the size of the whole waste water treatment apparatus.

In the waste water treatment apparatus 70, carriers 54 in which ammonium oxidizing bacteria have been accumulated with higher priority are packed in the aerobic reaction tank 24, from the viewpoint of efficiently conducting a nitrite type oxidation (nitrification) in the aerobic reaction tank 24.

Figure 15:
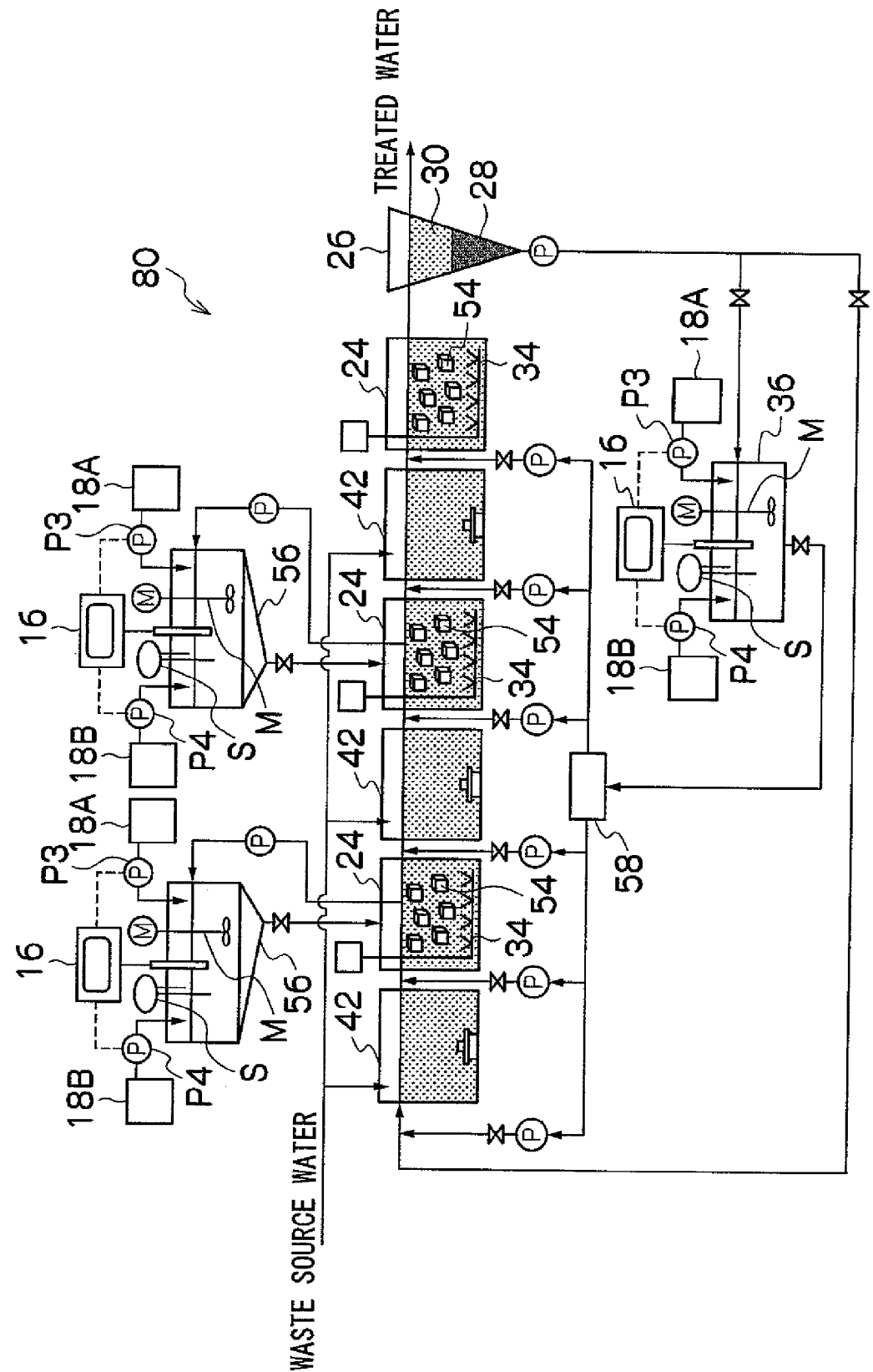
FIG. 15 is a block diagram illustrating a modified example of the waste water treatment apparatus illustrated in FIG. 14.

Incidentally, in the waste water treatment apparatus 70, the carriers 54 are not subjected to the alkali treatment (regeneration treatment), but as is illustrated in FIG. 15, the carriers 54 may be periodically subjected to the alkali treatment (regeneration treatment) in the carrier regeneration treatment tank 56 which has been described already.

What is claimed is:

1. An apparatus for producing a nitrite type nitrification-reactive sludge, comprising:
an alkali treatment apparatus with an alkali treatment tank and a pump for supplying an alkaline liquid to an activated sludge in the alkali treatment tank, wherein the alkali treatment apparatus is configured to subject the activated sludge containing at least ammonium oxidizing bacteria and nitrite oxidizing bacteria to alkali treatment therein by supplying the alkaline liquid to the alkali treatment tank by the pump to control the pH of the activated sludge to a value of 10 or higher, such that the ammonium oxidizing bacteria are accumulated and the nitrite oxidizing bacteria are deactivated in the activated sludge.

2. The apparatus for producing a nitrite type nitrification-reactive sludge according to claim 1, further comprising a sedimentation tank configured receive an effluent from of the alkali treatment apparatus, the effluent including the activated sludge containing the accumulated ammonium oxidizing bacteria and the deactivated nitrite oxidizing bacteria, and the alkali treatment apparatus being configured to receive a dewatered activated sludge containing the accumulated ammonium oxidizing bacteria and the deactivated nitrite oxidizing bacteria from the sedimentation tank.

3. A waste water treatment apparatus for treating a waste water containing ammonium nitrogen, comprising:
an alkali treatment apparatus which subjects an activated sludge containing at least ammonium oxidizing bacteria and nitrite oxidizing bacteria to alkali treatment therein so that the pH of the activated sludge can be 10 or higher;
a nitrite-forming tank in which the ammonium nitrogen contained in the waste water is oxidized to nitrite with the activated sludge which has been subjected to the alkali treatment;
a denitrification tank in which the nitrite is subjected to denitrification treatment;
a recovery apparatus which recovers the activated sludge from the nitrite-forming tank; and
a regeneration apparatus which subjects the activated sludge which has been recovered by the recovery apparatus to the alkali treatment therein to regenerate the activated sludge.

4. The waste water treatment apparatus according to claim 3, wherein the nitrite which has been formed in the nitrite-forming tank is denitrified by anaerobic ammonium oxidizing bacteria, while using the ammonium nitrogen contained in the waste water as a hydrogen donor, in the denitrification tank.

5. The waste water treatment apparatus according to claim 3, wherein the nitrite which has been formed in the nitrite-forming tank is denitrified by denitrifying bacteria, in the denitrification tank.

6. A waste water treatment apparatus for treating a waste water containing ammonium nitrogen, comprising:

an alkali treatment apparatus which subjects an activated sludge containing at least ammonium oxidizing bacteria and nitrite oxidizing bacteria to alkali treatment therein so that the pH of the activated sludge can be 10 or higher;

a nitrite-forming tank in which the ammonium nitrogen contained in the waste water is oxidized to nitrite with the activated sludge which has been subjected to the alkali treatment;

a denitrification tank in which the nitrite is subjected to denitrification treatment; and a pH-adjusting apparatus which adjusts the pH of the activated sludge by adding an acid agent to the activated sludge which has been subjected to the alkali treatment.

7. The waste water treatment apparatus according to claim 6, wherein the nitrite which has been formed in the nitrite-forming tank is denitrified by anaerobic ammonium oxidizing bacteria, while using the ammonium nitrogen contained in the waste water as a hydrogen donor, in the denitrification tank.

8. The waste water treatment apparatus according to claim 6, wherein the nitrite which has been formed in the nitrite-forming tank is denitrified by denitrifying bacteria, in the denitrification tank.

* * * * *